(12) United States Patent
Xie et al.

(10) Patent No.: US 8,277,594 B2
(45) Date of Patent: Oct. 2, 2012

(54) SELF-CLEANING DRY ADHESIVES

(75) Inventors: Tao Xie, Troy, MI (US); Ruomiao Wang, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 980 days.

(21) Appl. No.: 12/255,029

(22) Filed: Oct. 21, 2008

(65) Prior Publication Data
US 2010/0098932 A1 Apr. 22, 2010

(51) Int. Cl.
*B29C 65/48* (2006.01)
*B32B 37/26* (2006.01)
*B32B 38/00* (2006.01)
*C09J 5/00* (2006.01)

(52) U.S. Cl. ............. 156/247; 156/311; 427/207.1; 427/208.8; 427/258; 427/371; 427/407.1; 427/412.4

(58) Field of Classification Search .......... 156/247, 156/311; 428/297.4, 473.5, 474.4, 480, 412; 427/207.1, 208.8, 258, 331, 371, 402, 407.1, 427/412.4
See application file for complete search history.

(56) References Cited

U.S. PATENT DOCUMENTS

| | | | |
|---|---|---|---|
| 5,755,913 A | 5/1998 | Liaw et al. | |
| 6,156,842 A * | 12/2000 | Hoenig et al. | ............ 525/171 |
| 6,160,084 A | 12/2000 | Langer et al. | |
| 6,759,481 B2 | 7/2004 | Tong | |
| 6,773,535 B1 | 8/2004 | Wetzel | |
| 6,827,325 B2 | 12/2004 | Hofmann et al. | |
| 6,986,855 B1 | 1/2006 | Hood et al. | |
| 7,188,498 B2 | 3/2007 | Browne et al. | |
| 7,331,087 B2 * | 2/2008 | Lindsay et al. | .......... 24/442 |
| 2001/0047579 A1 | 12/2001 | Lee et al. | |
| 2004/0002273 A1 * | 1/2004 | Fitting et al. | ........ 442/351 |
| 2005/0132543 A1 * | 6/2005 | Lindsay et al. | .......... 24/442 |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0271869 A1 * | 12/2005 | Jackson | ......... 428/297.4 |
| 2005/0271870 A1 * | 12/2005 | Jackson | ......... 428/297.7 |
| 2005/0274455 A1 | 12/2005 | Extrand | |
| 2006/0036045 A1 | 2/2006 | Wilson et al. | |

(Continued)

FOREIGN PATENT DOCUMENTS

WO 2008131222 A1 10/2008

OTHER PUBLICATIONS

Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Xie et al., Self-Peeling Reversible Dry Adhesive System, Chem. Mater., 2008, pp. 2866-2868, vol. 20.

(Continued)

*Primary Examiner* — Sing P Chan
(74) *Attorney, Agent, or Firm* — BrooksGroup

(57) ABSTRACT

A shape memory polymer microfiber material coupled to a base portion and coated with a dry adhesive in which the tips of the microfibers may be modified to achieve superhydrophobicity. The resultant surface of the material may be altered between to an adhesive state from a superhydrophobic state as the shape memory polymer transforms from its permanent shape to a temporary shape. The shape memory polymer microfiber material may be reversibly coupled to one or more substrates when in the adhesive state and uncoupled when in the superhydrophobic state.

19 Claims, 2 Drawing Sheets

U.S. PATENT DOCUMENTS

| | | | |
|---|---|---|---|
| 2006/0156535 | A1 | 7/2006 | Browne et al. |
| 2006/0273876 | A1* | 12/2006 | Pachla et al. ............... 337/140 |
| 2007/0073130 | A1 | 3/2007 | Finch et al. |
| 2007/0175818 | A1* | 8/2007 | Xie ..................... 210/500.27 |
| 2007/0289786 | A1 | 12/2007 | Cutkosky et al. |
| 2008/0023439 | A1* | 1/2008 | Jackson ...................... 216/33 |
| 2008/0081147 | A1* | 4/2008 | Lindsay et al. ............. 428/100 |
| 2008/0280085 | A1* | 11/2008 | Livne ....................... 428/40.1 |
| 2010/0136281 | A1* | 6/2010 | Sitti et al. .................... 428/92 |

OTHER PUBLICATIONS

Liu et al., Chemically Cross-Linked Polycyclooctene: Synthesis, Characterization and Shape Memory Behavior, Macromolecules, 2002. pp. 9868-9874, vol. 35.

Lendlein et al., Biodegradable, Elastic Shape-Memory Polymers for Potential Biomedical Applications, Science, May 31, 2002, pp. 1673-1676, vol. 296.

Lee et al., Structure and Thermomechanical Properties of Polyurethane Block Copolymers with Shape Memory Effect, Macromolecules, 2001, pp. 6431-6437, vol. 34.

Lin et al., Study on Shape-Memory Behavior of Polyether-Based Polyurethanes. I. Influence of the Hard-Segment Content, J. of Applied Polymer Science, 1998, pp. 1563-1574, V.69.

Lin et al., Study on Shape-Memory Behavior of Polyether-Based Polyurethanes. II. Influence of Soft-Segment Molecular Weight, J. of App. Polymer Science, 1998, pp. 1575-1586, 69.

EPON Resin 828 Structural Reference Manual, Shell Chemicals, Houston, TX.

Gall et al., Shape Memory Polymer Nanocomposites, Acta Materialia, 2002, pp. 5115-5126, vol. 50, Oct. 10, 1999.

Gall et al., Internal Stress Storage in Shape Memory Polymer Nanocomposites, Applied Physics Letter, Jul. 12, 2004, pp. 290-292, vol. 85, No. 2.

Xu et al., Synthesis and Shape Memory Effects of Si-O-Si Cross-Linked Hybrid Polyurethanes, Polymer, 2006, pp. 457-465, vol. 47.

Crystallisation of Liquid DGEBPA and DGEBPF Epoxy Resins, Resolution Performance Products, Product Bulletin, SC:2365-01, Jul. 2001.

Jeffamine D-230 Polyetheramine, Technical Bulletin, Huntsman Corporation, Copyright 2006.

Xie et al., Self-Peeling Reversible Dry Adhesive System, Materials, & Processes Laboratory, General Motors Research & Development Center, Chem. Mater. 2008,vol. 20, pp. 2866-2862.

Aubert et al., Thermally Removable Epoxy Adhesives Incorporating Thermally Reversible Diels-Alder Adducts, The Journal of Adhesion, 2003, vol. 79, pp. 609-616.

International Search Report and Written Opinion, International Application No. PCT/US/2008/060796 Filed Apr. 18 2008, Appicant GM Global Technology Operations, Inc.

Unver et al., Geckbot: A Gecko Inspired Climbing Robot Using Elastomer Adhesives.

Daltorio et al., A Small Wall-Walking Robot with Compliant, Adhesive, Feet, IEEE/RSJ International Conference on Intelligent Robots and Systems, 2005, pp. 4018-4023.

International Search Report and Written Opinon, International Application No. PCT/US2008/060826 filed Apr. 18, 2008, Applicant GM Global Technology Operations, Inc.

Lee et al., A Reversible Wet/Dry Adhesive Inspired by Mussels and Geckos, Nature, Jul. 19, 2007, pp. 338-342, vol. 448.

Lee et al., Single-Molecule Mechanics of Mussel Adhesion, PNAS, Aug. 29, 2005, pp. 12999-13--3, vol. 103, No. 35.

Veriflex Shape Memory Polymer, http://www.crgrp.net/veriflex.shtml, Cornerstone Research Group, Inc., 2003-2007.

Shape Memory Polymer, http://crgnp.net/success-stories.shtml, Cornerstone Research Group, Inc., 2003-2007.

TEMBO Shape Memory Polymers and Elastic Memory Composite (EMC) Material, http://www.ctd-materials.com/products/emc.htm, Cornerstone Research Group, Inc., 2003-2007.

Behl et al., Shape-Memory Polymers: Dual Shape Materials for Bio-medical Applications, A. Mater. Today, 2007, vol. 10, pp. 1-20.

Bellin et al., Polymeric Triple-Shape Materials, PNAS, Nov. 28, 2006, vol. 103, No. 48, pp. 18043-18047.

Chung et al., Two-Way Reversible Shape Memory in a Semicrystalline Network, Macromolecules, 2008, vol. 41, pp. 184-192.

Rousseau et al., Shape Memory Effect Exhibited by Smectic-C Liquid Crystalline Elastomers, J. Am. Chem. Soc., 2003, vol. 125, pp. 15300-15301.

Liu et al., Review of Progress in Shape-Memory Polymers, Journal of Materials Chemistry, 2007, vol. 17, pp. 1543-1558.

Dietsch et al., A Review—Features and Benefits of Shape Memory Polymers (SMPs), Journal of Advanced Materials, Apr. 2007, vol. 39, No. 2, pp. 3-12.

Li et al., Shape Memory Effect of Ethylene—Vinyl Acetate Copolymers, Journal of Applied Polymer Science, 1999, vol. 71, pp. 1063-1070.

Liu et al., Novel Shape-Memory Polymer with Two Transition Temperatures, Macromol. Rapid Commun., 2005, vol. 26, pp. 649-652.

Reyntjens et al., Polymer Networks Containign Crystallizable Poly(octadecyl vinyl ether) Segments for Shape-Memory Materials, Macromol. Rapid Commun., 1999, vol. 20,pp. 251-255.

Jiang et al., Polymers Move in Response to Light, Advanced Materials., 2006, vol. 18, pp. 1471-1475.

Huang et al., Water-Driven Programmable Polyurethane Shape Memory Polymer: Demonstration and Mechanism, Applied Physical Letters, 2005, vol. 86, pp. 114105-1--3.

Lendlein et al., Light-Induced Shape-Memory Polymers, Nature, Apr. 14, 2005, vol. 434, pp. 879-882.

Goethals et al., Poly(vinyl ethers) as Building Blocks for New Materials, Macromol. Symp. 1998, vol. 132, pp. 57-64.

Xiao, U.S. Appl. No. 12/273,083, Self-Healing and Scratch Resistant Shape Memory Polymer System, filed Nov. 18, 2008.

Xie, U.S. Appl. No. 11/867,531, Reversible Dry Adhesives, filed Oct. 4, 2007.

Xie, U.S. Appl. No. 12/396,045, Polymer Systems with Multiple Shape Memory Effect, filed Mar. 2, 2009.

Xie, U.S. Appl. No. 12/367,826, A Reversible Welding Process for Polymers, filed Feb. 9, 2009.

Xie, U.S. Appl. No. 12/178,844, High Strength Reversible Noncovalent Adhesion Methods for a Solid Polymer-Polymer Interface, filed Jul. 24, 2008.

Cheng, U.S. Appl. No. 12/359,709, Remote Activation of Thermo-Reversible Dry Adhesives, filed Jan. 26, 2009.

Xie, U.S. Appl. No. 12/423,947, Shape Memory Polymer and Adhesive Combination and Methods of Making and Using the Same, filed Apr. 15, 2009.

Xie, U.S. Appl. No. 12/432,211, Shape Memor Polymers with Surface Having Dangling Adhesive Polymeric Chains and Methods of Making and Using the Same, filed Apr. 29, 2009.

Xie, U.S. Appl. No. 12/181,562, Polymer Systems with Multiple Shape Memory Effect, filed Jul. 29, 2008.

Xie, U.S. Appl. No. 11/867,549, Method of Miniimizing Residue Adhesion for Thermo-Reversible Dry Adhesives, filed Oct. 4, 2007.

Xie, U.S. Appl. No. 12/105,865, Attachment Pad with Thermal Reversible Adhesive and Methods of Making and Using the Same, filed Apr. 18, 2008.

Xie, U.S. Appl. No. 11/867,558, Multilayer Adhesive for Thermal Reversible Joining of Substrates, filed Oct. 4, 2007.

Xie, U.S. Appl. No. 12/391,704, Reversible Dry Adhesives for Wet adn Dry Conditions, filed Feb. 24, 2009.

Xie, U.S. Appl. No. 12/105,749, Method for Robotic Handling Using Thermo-Reversible Dry Adhesives, filed Apr. 18, 2008.

Xie, U.S. Appl. No. 12/105,788, Climbing Devices Based on Thermo-Reversible Dry Adhesives, filed Apr. 18, 2008.

Xie, U.S. Appl. No. 11/867,588, Shape Memory Epoxy Polymers, filed Oct. 4, 2007.

German Office Action DE 10 2009 048 704.2-43; Dated Apr. 14, 2011; 4 pages.

* cited by examiner

SELF-CLEANING DRY ADHESIVES

TECHNICAL FIELD

The field to which the disclosure generally relates to polymer adhesives and more specifically to self-cleaning dry adhesives.

BACKGROUND

Typical dry adhesives are sticky. Sticky materials can be easily contaminated and lose some or all of their stickiness.

SUMMARY OF EXEMPLARY EMBODIMENTS

An exemplary embodiment discloses an adhesive system having one or more shape memory polymer microfibers coupled to a base portion. The one or more microfibers are coated with a dry adhesive material. The tip portions of the one or more microfibers may then be coated with a hydrophobic material.

In other exemplary embodiments, the shape memory polymer microfibers of the adhesive system as described above may be transformed from their permanent shape to their temporary shape and reversibly coupled to one or more substrate materials. The microfibers may be subsequently uncoupled from the one or more substrate materials by transforming the microfibers back to their permanent shape.

Another exemplary embodiment discloses a method for forming a self cleaning dry adhesive system by forming and coupling together one or more shape memory microfibers to a base portion, applying an adhesive material to an outer surface of the base portion and microfibers, and applying a hydrophobic material to the tip portion of the microfibers.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Shape memory polymers (SMPs) represent responsive polymers that can fix to deformed temporary shapes and recover to their permanent (original) shapes only upon external stimuli. SMPs may be available exhibiting a dual shape memory effect (DSME), wherein the SMP can only memorize one temporary shape in addition to its permanent shape in each shape memory cycle. It is also contemplated that SMPs may be available exhibiting a triple shape memory effect (TSME) or greater, wherein the SMP can memorize two distinct temporary shapes (for a TSME) or more in addition to its permanent shape in each memory cycle.

In general, to transform an SMP from its permanent shape to its temporary shape, the permanent shape may be heated to a first elevated temperature and then deformed under stress to yield the first temporary shape, a shape which may be different in visual appearance from the permanent shape. By definition, the first elevated temperature is a temperature sufficiently high to ensure a phase transition of the SMP (e.g. is a temperature above the glass transition temperature ($T_g$) of SMP). The SMP may then be cooled under stress to a temperature below the glass transition temperature of one SMP, wherein the stress may be relieved while maintaining the first temporary shape. To recover the permanent shape from the first temporary shape, the SMP may be reheated to the first elevated temperature in the absence of stress.

An exemplary embodiment creates a self-cleaning dry adhesive from the SMP that takes advantage of the SMP's ability to transform from a permanent shape to a temporary shape.

Figure 1A:
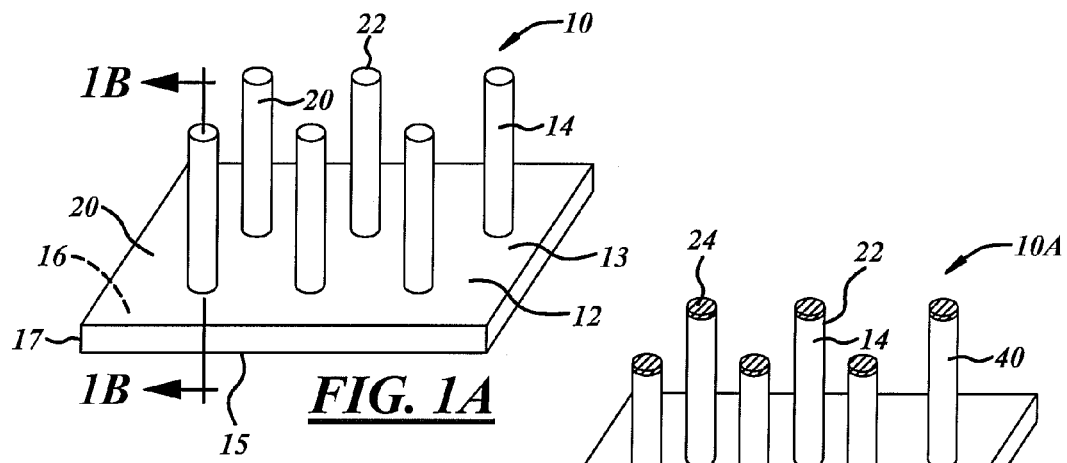
FIG. 1A is a perspective view of a shape memory polymer adhesive material without a hydrophobic coating in its permanent shape.
Figure 1B:
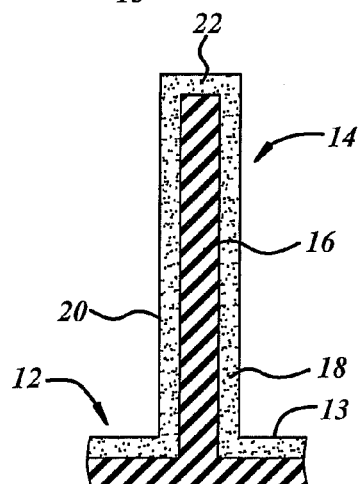
FIG. 1B is a section view of the shape memory polymer adhesive material of FIG. 1A taken along line 1A-1A.

Referring first to FIGS. 1A and 1B, a shape memory polymer adhesive material 10 may be shown as having a base portion 12 and a plurality of raised microfibers 14. The base portion 12 and each of the raised microfibers 14 may be formed of a shape memory polymer substrate material 16 coated along its outer surfaces 18 with a dry adhesive material 20. Alternatively, the base portion 12 may be formed from another material, such as a non-shape memory polymer material, wherein the microfibers 14 are coupled or otherwise affixed to the base portion 12 using an adhesive material or some alterative coupling device.

Figure 4:
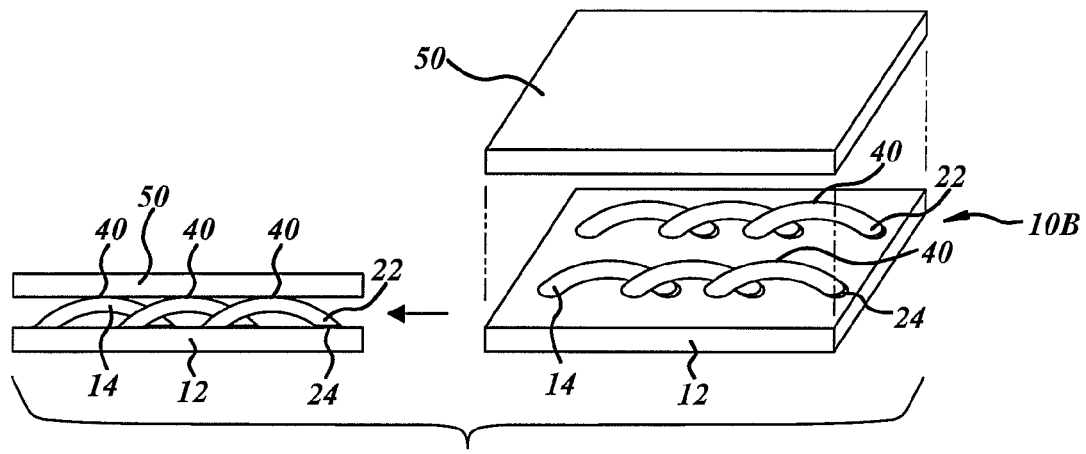
FIG. 4 is a perspective view of the shape memory polymer adhesive material of FIG. 3 coupled to a substrate.
Figure 5:
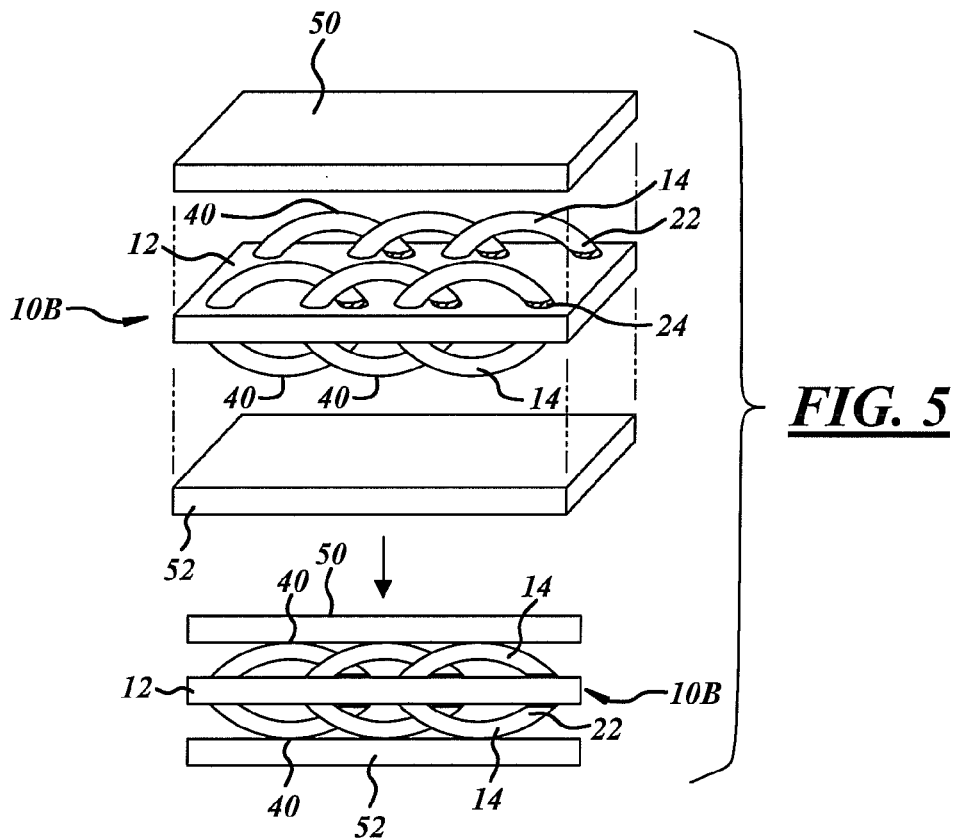
FIG. 5 is a perspective view of the shape memory polymer adhesive material of FIG. 3 coupled to a pair of substrates.

While the microfibers 14 are illustrated in FIGS. 1A and 1B as extending from a top surface 13 of the base portion 12, it should be understood that additional microfibers 14 may extend, for example, from the bottom surface 15 (as shown in FIG. 5) or a side surface 17 of the base portion 12 and still fall within the spirit of the present invention. In addition, while the shape of the base portion 12 shown herein is essentially square shaped, the exemplary embodiments is not limited to the arrangement presented herein, but may include other non-square shapes such as circular rectangular, or any other regular or irregular shape. Moreover, while the base portion 12 shown in the Figures is essentially flat (i.e. having a top surface 13 and a bottom surface 15 and a small side surface 17), the base portion 12 is not limited to a substantially flat arrangement, but may take on any shape such as cubical, spherical, or oblong. In addition, the size, length and overall shape of the microfibers 14 may not be limited to the arrangement illustrated in FIGS. 1-6.

Figure 2:
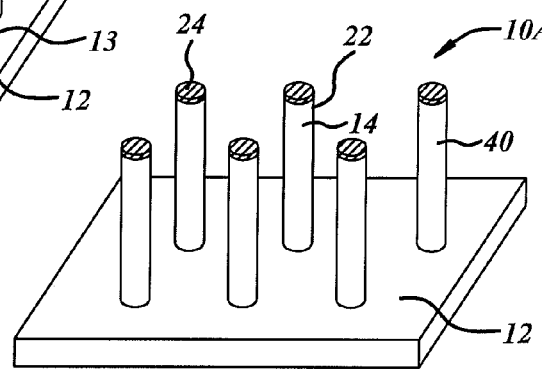
FIG. 2 is a perspective view of a shape memory polymer adhesive material with a hydrophobic coating in its permanent shape.

As shown in FIG. 2, the adhesive material 20 at the tips 22 of each of the raised microfibers 14 may also be coated with a hydrophobic material 24. This hydrophobic material 24 may enhance the micro-fibrous topography of the tips 22 to yield a superhydrophobic surface that may aid in preventing contaminants from sticking to shape memory polymer adhesive material 10 between uses. In other words, the hydrophobic material 24 may form a so-called self cleaning surface.

As will be seen below, the shape memory polymer adhesive material 10 may be reversibly bonded to a separate substrate material (shown as 50 in FIG. 4) or reversible couple together multiple substrate materials (shown as 50 and 52 in FIG. 5).

The shape memory polymer substrate material 16 may be formed via a template molding method or other microfabrication method. In one non-limiting exemplary embodiment, a chemical system exhibiting shape memory effect was synthesized that included a branched polyethyleneimine (BPEI) polymer of varying molecular weights grafted onto a thermosetting epoxy SMP backbone to form the substrate material 16. In another non-limiting exemplary embodiment, a rigid aromatic diepoxide (EPON 826), a flexible aliphatic diepoxide (NGDE), and an aliphatic diamine (Jeffamine D-230) may be used to formulate an epoxy thermosetting SMP substrate material 16. Of course, many other polymeric materials not listed herein may be available for use as the substrate material 16.

The adhesive material 20 may be a material that has sufficient adherence to the underlying substrate material 16 over the wide variety of temperatures and conditions in which the adhesive material 10 may be utilized. The adhesive material 20 may have sufficient flexibility to maintain adherence to the underlying substrate material 16 as the adhesive material 10 transforms from its original permanent shape 30 to its one or more temporary shapes 32 The adhesive material 20 may be applied to the outer surfaces 18 using any number of application methods. One exemplary adhesive material that may be utilized is a thermosetting dry adhesive material.

The hydrophobic material 24 may be a material that has sufficient adherence to the underlying adhesive material 20 over the wide variety of temperatures and conditions in which the shape memory polymer adhesive material 10 may be utilized. The hydrophobic material 24 may have sufficient flexibility to maintain adherence to the underlying adhesive material 20 as the adhesive material 10 transforms from its original permanent shape 30 to its one or more temporary shapes 32. The hydrophobic material 24 may be applied to the adhesive material 20 on the tips 22 of the microfibers 14 using any number of application methods, including spraying, dipping and the like. Some non-limiting exemplary embodiments of hydrophobic materials that may be utilized included fluorinated polymers and long-chain aliphatic molecules.

Figure 3:
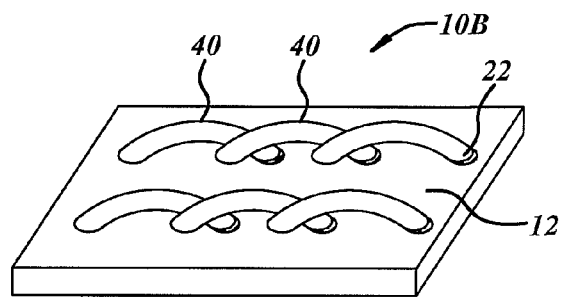
FIG. 3 is a perspective view of the shape memory polymer adhesive material of FIG. 2 transformed to a temporary shape.

Referring now to FIG. 3, in order to utilize the dry adhesive properties of the shape memory polymer adhesive material 10, the adhesive material may be hot-pressed under a shear load and cooled under load. The hot pressing process transforms the shape memory polymer from its permanent shape 10A, as shown in FIG. 2, to its temporary shape 10B, as shown in FIG. 3. In this exemplary embodiment, the temporary shape 10B may be characterized wherein the microfibers 14 are pressed downward and to the side such that the tips 22 are in close contact to the base material 12, therein exposing the side portions 40 of the microfibers 14 having the adhesive material coating 20.

As shown in FIG. 4, this exposure may allow the adhesive material coating 20 of the side portions 40 to contact and adhere to a single substrate 50. In an alternative exemplary embodiment, as shown in FIG. 5, a single adhesive material 10, in its temporary shape 10B, may be used to adhere together two separate substrate materials 50, 52.

The substrate materials 50 and 52 may be formed of the same material or separate materials. Non-limiting examples of substrate materials 50 and 52 include glass substrates, polymer substrates, metal substrates and other non-metal substrates.

Figure 6:
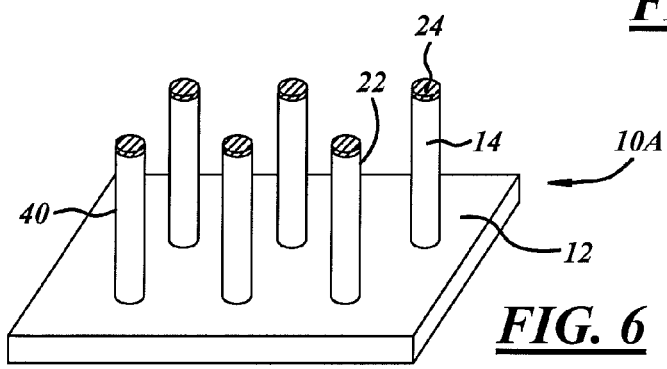
FIG. 6 is a perspective view of the shape memory polymer adhesive material of FIG. 2 transformed back to its permanent shape.

To reverse the adherence to the substrate 50 or substrates 50, 52, the adhesive material 10 may be reheated above the glass transition temperature for the shape memory polymer substrate material 16, thus transforming the adhesive material 10 from its temporary shape 10B to its original permanent shape 10A (as shown in FIG. 6 without the accompanying substrates 50 or 52). The reheating may also cause the overlying adhesive material 20 to become more flexible, which may allow it to be uncoupled from the substrate 50 or substrates 50, 52 with minimal force.

The recovered shape memory polymer adhesive material 10 in FIG. 6 may therefore return to its superhydrophobic state (i.e. the non-adhesive state) as shown in FIG. 2, in which the tips 22 of the microfibers 14 containing the hydrophobic material 24 extend outwardly away from the base portion 12. In the superhydrophobic state, as stated above, the hydrophobic material 24 may aid in preventing contaminants contacting the exposed adhesive material 20 on the side portions 40, thereby allowing the adhesive material to retain its tackiness for subsequent use.

Thus, the exemplary embodiments, such as those disclosed herein, provides a reversible adhesive system 10 that may be used over and over again. In between uses, the adhesive system may be transformed to a superhydrophobic state that substantially prevents contamination, and hence a loss of the adhesive qualities of the material (i.e. a loss of stickiness). The adhesive system 10 may quickly be transformed to an adhesive state for further use by simply heating the adhesive system 10 above the glass transition temperature of the substrate material 16 under a shear load to expose the side portions 40 of the microfibers 14.

The adhesive system 10 may be used to couple together multiple substrate materials on a permanent basis, or more likely on a temporary basis. For example, the adhesive system 10 may be used to temporarily coupled together two or more substrate materials during transport of the substrate to a new location, then be uncoupled from the substrate materials at their destination for other uses.

The above description of embodiments of the invention is merely exemplary in nature and, thus, variations thereof are not to be regarded as a departure from the spirit and scope of the invention.

What is claimed is:

1. A method comprising:
   providing a first substrate and a second substrate;
   forming a base portion;
   forming a shape memory polymer adhesive system comprising a shape memory polymer substrate material comprising a plurality of microfibers coupled to and extending from said base portion, an adhesive material coupled onto an outer surface of said shape memory polymer substrate material, and a hydrophobic material coupled to a portion of said adhesive material along a tip of each of said one or more microfibers, said shape memory polymer adhesive system transformable from a permanent shape to a temporary shape;
   transforming said shape memory polymer adhesive system from said permanent shape to said temporary shape; and
   coupling said first substrate to said second substrate with said shape memory polymer adhesive system in said temporary shape.

2. The method of claim 1, wherein said base portion comprises said shape memory polymer substrate material and is integrally formed with said plurality of microfibers.

3. The method of claim 1 further comprising:
uncoupling said first substrate from said second substrate.

4. The method of claim 1, wherein transforming said shape memory polymer adhesive system from said permanent shape to said temporary shape comprises:
transforming said shape memory polymer adhesive system from said permanent shape to said temporary shape by heating said shape memory polymer adhesive system to a first temperature under a shear load, said first temperature being above the glass transition temperature of said shape memory polymer substrate material; and
cooling said shape memory polymer adhesive system in said temporary shape below said first temperature; and
removing said shear load.

5. The method of claim 4, wherein the transformation of said shape memory polymer adhesive system from said permanent shape to said temporary shape causes said tip of each of said plurality of microfibers to be brought in close proximity to said base portion to expose a side portion of said plurality of microfibers.

6. The method of claim 5, wherein coupling said first substrate to said second substrate with said shape memory polymer adhesive system in said temporary shape comprises:
adhering said adhesive material of said side portion of at least one of said plurality of microfibers to said first substrate; and
adhering said adhesive material of said side portion of at least another one of said plurality of microfibers to said second substrate.

7. The method of claim 6 further comprising:
heating said shape memory polymer adhesive system above said glass transition temperature in the absence of said shear load;
uncoupling said first substrate from said shape memory polymer adhesive system; and
uncoupling said second substrate from said shape memory polymer adhesive system.

8. A method for forming a self cleaning dry adhesive comprising:
forming a shape memory polymer substrate material one or more microfiber portions, each of said one or more microfiber portions including a side portion and a tip portion;
forming a base portion;
coupling said one or more microfiber portions to said base portion;
applying an adhesive material to an outer surface of said one or more microfiber portions; and
applying a hydrophobic portion onto a portion of said adhesive material, said portion of said adhesive material corresponding to said tip portion of said shape memory polymer substrate material.

9. The method of claim 8, wherein said base portion is integrally formed with said one or more microfibers and comprises said shape memory polymer substrate material.

10. The method of claim 9, wherein forming a shape memory polymer substrate material comprises forming a shape memory polymer substrate material having a base portion and one or more microfiber portions extending from said base portion using a template molding method.

11. The method of claim 8 further comprising:
transforming the self-cleaning dry adhesive from a superhydrophobic state to an adhesive state, wherein the transforming of the self-cleaning dry adhesive from said superhydrophobic state to said adhesive state causes said tip portion of each of said one or more microfiber portions to move in closer proximity to said base portion.

12. The method of claim 11, wherein transforming the self-cleaning dry adhesive from a superhydrophobic state to an adhesive state comprises:
heating said shape memory polymer adhesive system to a first temperature under a shear load, said first temperature being above the glass transition temperature of said shape-memory polymer substrate material;
cooling said shape memory polymer adhesive system below said first temperature; and
removing said shear load.

13. The method of claim 12 further comprising:
transforming the self-cleaning dry adhesive from said adhesive state to said superhydrophobic state by heating said shape memory polymer adhesive system to a first temperature in the absence of said shear load.

14. The method of claim 13, wherein the transforming of the self-cleaning dry adhesive from said adhesive state to said superhydrophobic state causes said tip portion of each of said one or more microfiber portions to move away from said base portion.

15. A method comprising:
providing a first substrate;
forming a base portion;
forming a shape memory polymer adhesive system comprising a shape memory polymer substrate material comprising a plurality of microfibers coupled to and extending from said base portion, an adhesive material coupled onto an outer surface of said shape memory polymer substrate material, and a hydrophobic material coupled to a portion of said adhesive material along a tip of each of said one or more microfibers, said shape memory polymer adhesive system transformable from a permanent shape to a temporary shape;
transforming said shape memory polymer adhesive system from said permanent shape to said temporary shape; and
coupling said first substrate to said shape memory polymer adhesive system in said temporary shape.

16. The method of claim 15, wherein transforming said shape memory polymer adhesive system from said permanent shape to said temporary shape comprises:
transforming said shape memory polymer adhesive system from said permanent shape to said temporary shape by heating said shape memory polymer adhesive system to a first temperature under a shear load, said first temperature being above the glass transition temperature of said shape memory polymer substrate material; and
cooling said shape memory polymer adhesive system in said temporary shape below said first temperature; and
removing said shear load.

17. The method of claim 16, wherein the transformation of said shape memory polymer adhesive system from said permanent shape to said temporary shape causes said tip of each of said plurality of microfibers to be brought in close proximity to said base portion to expose a side portion of said plurality of microfibers.

18. The method of claim 16 further comprising:
heating said shape memory polymer adhesive system above said glass transition temperature in the absence of said shear load; and
uncoupling said first substrate from said shape memory polymer adhesive system.

19. The method of claim 15, wherein coupling said first substrate to said shape memory polymer adhesive system in said temporary shape comprises adhering said adhesive material of at least one of said plurality of microfibers to said first substrate.

* * * * *